(12) United States Patent    (10) Patent No.:   US 12,683,851 B2
Hua et al.        (45) Date of Patent:     Jul. 14, 2026

(54) DATA TRANSMISSION METHOD AND APPARATUS, COMMUNICATION NODE, AND STORAGE MEDIUM

(71) Applicant: ZTE CORPORATION, Shenzhen (CN)

(72) Inventors: Jian Hua, Shenzhen (CN); Yu Xin, Shenzhen (CN); Tong Bao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 220 days.

(21) Appl. No.: 18/575,037

(22) PCT Filed: Aug. 9, 2022

(86) PCT No.: PCT/CN2022/111030
§ 371 (c)(1),
(2) Date: Dec. 28, 2023

(87) PCT Pub. No.: WO2023/016432
PCT Pub. Date: Feb. 16, 2023

(65) Prior Publication Data
US 2024/0250861 A1     Jul. 25, 2024

(30) Foreign Application Priority Data

Aug. 13, 2021    (CN) .......................... 202110930948.7

(51) Int. Cl.
*H04L 5/12*       (2006.01)
*H04L 27/20*     (2006.01)
(Continued)

(52) U.S. Cl.
CPC ........ *H04L 27/362* (2013.01); *H04L 27/2067* (2013.01); *H04L 27/2614* (2013.01)

(58) Field of Classification Search
CPC ............... H04L 27/362; H04L 27/2067; H04L 27/2614
(Continued)

(56) References Cited

U.S. PATENT DOCUMENTS

| | | | |
|---|---|---|---|
| 6,459,723 B1 | 10/2002 | Kim et al. | |
| 2002/0089923 A1 | 7/2002 | Yoshida et al. | |

(Continued)

FOREIGN PATENT DOCUMENTS

| | | |
|---|---|---|
| CN | 108781132 A | 11/2018 |
| CN | 111901277 A | 11/2020 |

(Continued)

OTHER PUBLICATIONS

Extended European Search Report in Application No. 22855413.5, dated Apr. 14, 2025, 11 pages.
(Continued)

*Primary Examiner* — Zewdu A Kassa
(74) *Attorney, Agent, or Firm* — Morgan, Lewis & Bockius LLP

(57) ABSTRACT

Provided are a data transmission method and apparatus, a communication node, and a storage medium. The method includes the following: Data is modulated in a time domain according to a set modulation manner to obtain modulated data, where the set modulation manner is associated with a time domain position of a modulation symbol in the modulated data; and the modulated data is transmitted.

20 Claims, 4 Drawing Sheets

Modulate data in a time domain according to a set modulation manner to obtain modulated data, where the set modulation manner is associated with a time domain position of a modulation symbol in the modulated data ⎯ 110

Transmit the modulated data ⎯ 120

(51) Int. Cl.
  *H04L 27/26* (2006.01)
  *H04L 27/36* (2006.01)
(58) Field of Classification Search
  USPC ................ 375/262, 260, 259, 219, 295, 316
  See application file for complete search history.

(56) References Cited

U.S. PATENT DOCUMENTS

| | | |
|---|---|---|
| 2015/0117866 A1 | 4/2015 | Chien et al. |
| 2017/0250792 A1* | 8/2017 | Su ........................ H04L 27/3405 |
| 2019/0222447 A1* | 7/2019 | Vos ..................... H04L 27/2636 |
| 2020/0186283 A1 | 6/2020 | Handte et al. |
| 2025/0030588 A1 | 1/2025 | Xin et al. |

FOREIGN PATENT DOCUMENTS

| | | |
|---|---|---|
| KR | 2013-0073528 A | 7/2013 |
| KR | 2020-0128610 A | 11/2020 |

OTHER PUBLICATIONS

Samsung, "Spectrum shaping for $\pi/2$-BPSK DFT-s-OFDM", 3GPP TSG RAN WG1 Meeting #89, Hangzhou, P.R. China, May 15-19, 2017, XP051274202, URL:http://www.3gpp.org/ftp/Meetings_3GPP_SYNC/RAN1/Docs/.
International Search Report in Application No. PCT/CN2022/111030, dated Oct. 21, 2022, 4 pages, including translation.
First Office Action in Korean Application No. 10-2024-7006362 dated Apr. 15, 2026, 12 pages, including translation.

* cited by examiner

| Modulate data in a time domain according to a set modulation manner to obtain modulated data, where the set modulation manner is associated with a time domain position of a modulation symbol in the modulated data | 110 |

| Transmit the modulated data | 120 |

FIG. 1

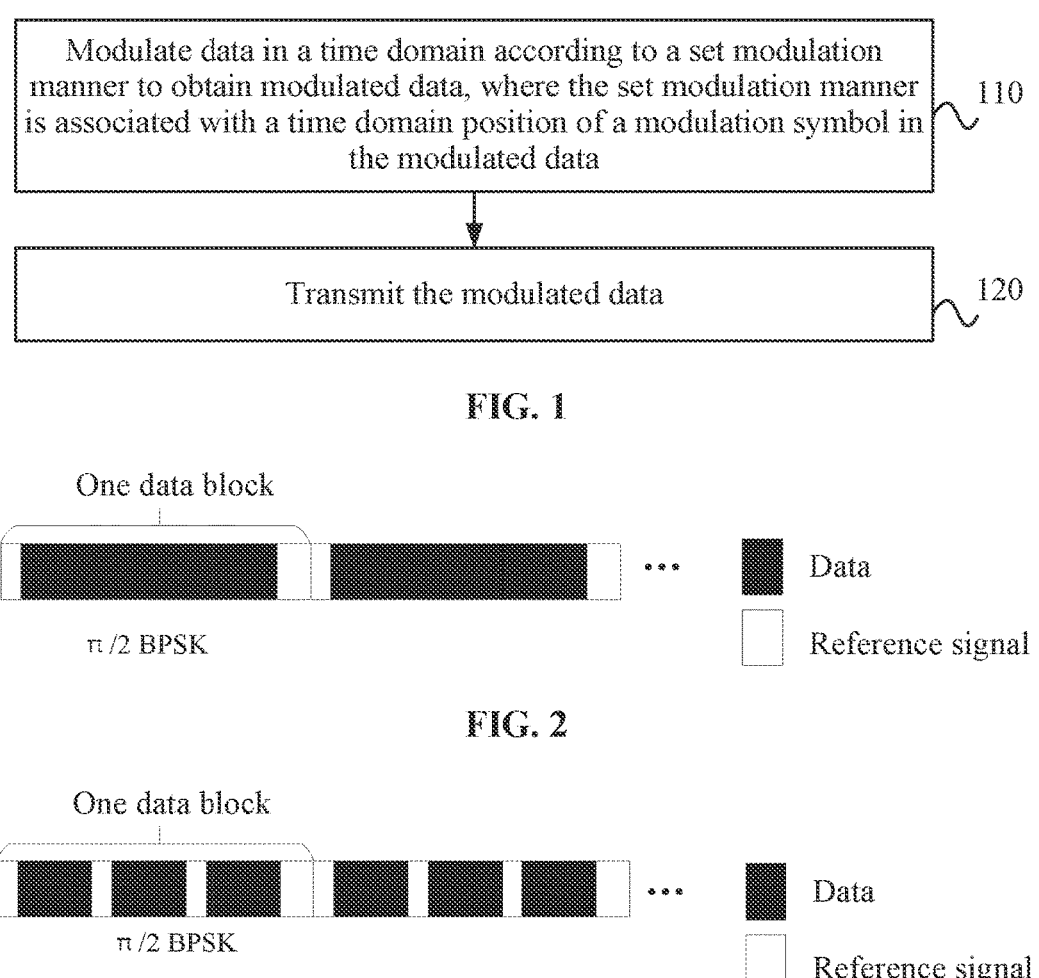

One data block

π /2 BPSK

■ Data

☐ Reference signal

FIG. 2

One data block

π /2 BPSK

■ Data

☐ Reference signal

FIG. 3

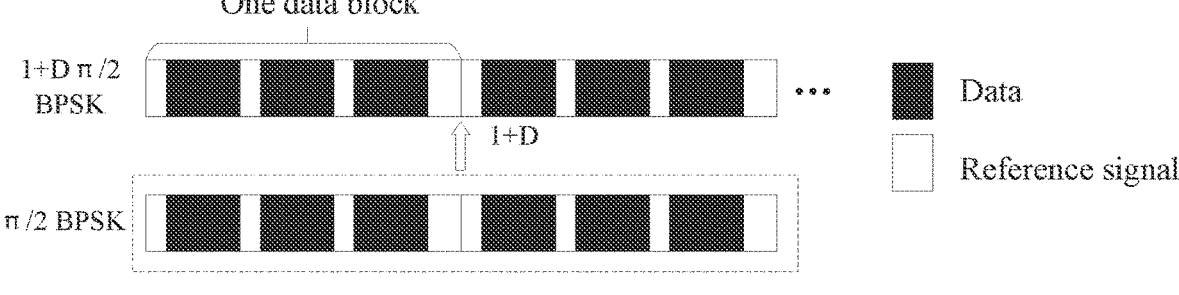

One data block

1+D π /2 BPSK

1+D

π /2 BPSK

■ Data

☐ Reference signal

FIG. 4

π/2 8QAM

○ *i* mod 2=0
Modulation symbol *i*
in an even position

● *i* mod 2=1
Modulation symbol i
in an odd position

One data block

π/2 8APSK

■ PTRS
(Head and tail)

□ DATA(Data)

▤ PTRS(Intermediate)

$i$ mod 2=0
Modulation symbol $i$
in an even position $i$ mod 2=1
Modulation symbol i
in an odd position

DATA TRANSMISSION METHOD AND APPARATUS, COMMUNICATION NODE, AND STORAGE MEDIUM

CROSS REFERENCE TO RELATED APPLICATIONS

This application is a national stage application filed under 35 U.S.C. 371 based on International Patent Application No. PCT/CN2022/111030, filed on Aug. 9, 2022, which claims priority to Chinese Patent Application No. 202110930948.7 filed with the CNIPA on Aug. 13, 2021, disclosures of which are incorporated herein by reference in their entireties.

TECHNICAL FIELD

The present application relates to the field of wireless communication network technology, for example, a data transmission method and apparatus, a communication node, and a storage medium.

BACKGROUND

A terahertz power amplifier may generate a high-level distortion when working in a saturation region, resulting in an excessively high peak average power ratio (PAPR). Additionally, in a high frequency scenario, due to relatively large path losses and shadow fading, some areas at the edge of a cell have a very low signal-to-noise ratio and a relatively high PAPR. An excessively high PAPR makes the dynamic range of the amplifier in a transmitter unable to meet the change of a signal, causing the signal to be distorted, destroying the orthogonality between sub-channel signals, and affecting the reliability of data modulation and transmission.

SUMMARY

The present application provides a data transmission method and apparatus, a communication node, and a storage medium to perform modulation regarding a time domain position of a symbol, thereby reducing a PAPR and improving the reliability of data modulation and transmission.

Embodiments of the present application provide a data transmission method. The method includes the steps below.

Data is modulated in a time domain according to a set modulation manner to obtain modulated data, where the set modulation manner is associated with a time domain position of a modulation symbol in the modulated data.

The modulated data is transmitted.

Embodiments of the present application further provide a data transmission apparatus. The data transmission apparatus includes a modulation module and a transmission module.

The modulation module is configured to modulate data in a time domain according to a set modulation manner to obtain modulated data, where the set modulation manner is associated with a time domain position of a modulation symbol in the modulated data.

The transmission module is configured to transmit the modulated data.

Embodiments of the present application further provide a communication node. The communication node includes a memory, a processor, and a computer program stored in the memory and executable by the processor, where when executing the program, the processor performs the preceding data transmission method.

Embodiments of the present application further provide a computer-readable storage medium for storing a computer program, where when the program is executed by a processor, the preceding data transmission method is performed.

BRIEF DESCRIPTION OF DRAWINGS

FIG. 1 is a flowchart of a data transmission method according to an embodiment.

FIG. 2 is a diagram of $\pi/2$ BPSK modulation according to an embodiment.

FIG. 3 is a diagram of $\pi/2$ BPSK modulation according to another embodiment.

FIG. 4 is a diagram of 1+D $\pi/2$ BPSK modulation according to an embodiment.

DETAILED DESCRIPTION

Figure 5:
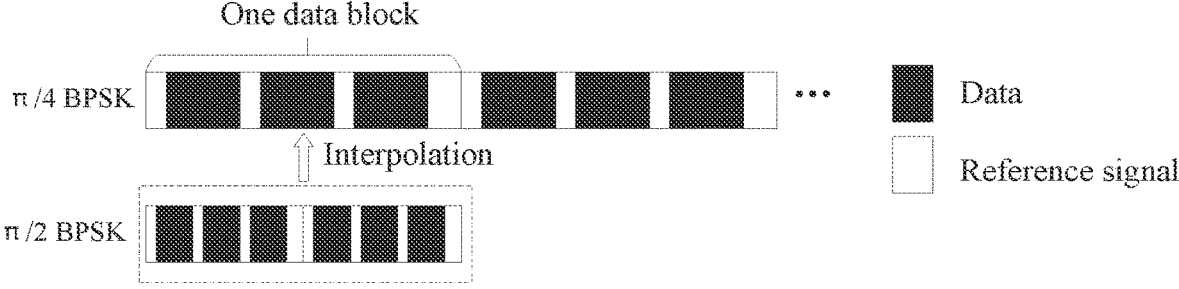
FIG. 5 is a diagram of 1+D $\pi/4$ BPSK modulation according to an embodiment.

The present application is described hereinafter in conjunction with the drawings and embodiments. It is to be understood that the embodiments described herein are intended to explain the present application and not to limit the present application. It is to be noted that if not in collision, embodiments of the present application and features therein may be combined with each other in any manner. Additionally, it is to be noted that for ease of description, only part of structures related to the present application, not all structures, are illustrated in the drawings.

A terahertz power amplifier may generate a high-level distortion when working in a saturation region, resulting in an excessively high PAPR. Additionally, in a high frequency scenario, due to relatively large path losses and shadow fading, some areas at the edge of a cell have a very low signal-to-noise ratio and a relatively high PAPR. Slowly-varying envelope modulation with a low complexity is a preferable selection for terahertz modulation. In a new radio (NR) standard, a discrete Fourier transform-spread orthogonal frequency division multiplexing (DFT-sOFDM) waveform is usually used to send a signal with a relatively low PAPR. Because the data of the signal is mapped in a time domain, the PAPR is lower than the PAPR of an OFDM waveform using a cyclic prefix (CP). Additionally, a Doppler shift is relatively large in the high frequency scenario, some phase deviations may remain in data symbols even if the receiving end makes a frequency offset compensation. Especially for some low-level terminals, phase noises may be larger due to the low cost and poor performance of devices. Single-carrier quadrature amplitude modulation (SC-QAM) can reduce the sensitivity of frequency offset, the phase noises, and the PAPR and can also reduce the complexity of signal processing through a frequency equalizer. However, the performance improvement of the SC-QAM is limited. Above all, a new data modulation solution needs to be proposed to reduce the PAPR and suppress the phase noises without affecting system spectrum efficiency.

Embodiments of the present application provide a data transmission method to perform data modulation in a time domain. A modulation manner is related to a time domain position of a modulation signal so as to reduce the PAPR and improve the reliability of data modulation and transmission.

FIG. 1 is a flowchart of a data transmission method according to an embodiment. As shown in FIG. 1, the method provided in this embodiment includes step 110 and step 120 described below.

In step 110, data is modulated in a time domain according to a set modulation manner to obtain modulated data, where the set modulation manner is associated with a time domain position of a modulation symbol in the modulated data.

In step 120, the modulated data is transmitted.

In this embodiment, the set modulation manner is associated with the time domain position of the modulation symbol. For example, a modulation symbol in an odd position and a modulation symbol in an even position are located in different quadrants of a constellation diagram so that modulation symbols in adjacent time domain positions are not in the same quadrant but in adjacent quadrants. Therefore, the data is mapped to the time domain to reduce a PAPR.

In an embodiment, a position of the modulation symbol in the constellation diagram is associated with the time domain position.

In an embodiment, the time domain position includes a time domain position that has not been oversampled or a time domain position that has not been upsampled.

In an embodiment, a data block of the modulated data includes one of: data information; data information, a head reference signal, and a tail reference signal; data information and an intermediate reference signal; or data information, a head reference signal, a tail reference signal, and an intermediate reference signal. On this basis, the relatively low PAPR can be guaranteed in the case where modulation is performed according to the time domain position of the data.

In an embodiment, the set modulation manner includes a binary phase shift keying modulation with a phase rotation of $\pi/2$ ($\pi/2$ BPSK modulation).

In an embodiment, in each data block of the modulated data, a modulation symbol in an odd position is located in a second quadrant of the constellation diagram or a fourth quadrant of the constellation diagram, and a modulation symbol in an even position is located in a first quadrant of the constellation diagram or a third quadrant of the constellation diagram.

Alternatively, in each slot corresponding to the modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram.

In this embodiment, the data modulation manner is set to the $\pi/2$ BPSK related to the time domain position, thereby guaranteeing the relatively low PAPR of a transmission end. Additionally, the relatively low PAPR can also be guaranteed in the case where the length inside a data block is odd.

In an embodiment, the set modulation manner includes a binary phase shift keying modulation with a phase rotation of $\pi/4$ ($\pi/4$ BPSK modulation).

Step 110 includes the following: The $\pi/2$ BPSK modulation is performed on the data to obtain first modulated data, and interpolating is performed between two adjacent modulation symbols in each data block of the first modulated data to obtain the modulated data.

In this embodiment, $\pi/4$ BPSK modulation manner is defined as follows: On the basis of the $\pi/2$ BPSK modulation, an interpolating operation is performed between the two adjacent modulation symbols. The phase of an interpolation is the phase mean of the two adjacent modulation symbols. The modulus of the interpolation is the same as the modulus of a $\pi/2$ BPSK modulation symbol. In this case, the data in each data block is first modulated into the first modulated data of $\pi/2$ BPSK. Here in each data block of the first modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram. Then interpolating is performed on each data block of the first modulated data to obtain the modulated data of $\pi/4$ BPSK.

In an embodiment, the set modulation manner includes $\pi/2$ BPSK modulation based on a delay accumulation.

Step 120 includes the following: The $\pi/2$ BPSK modulation is performed on the data to obtain the first modulated data, and the first modulated data is convolved with $[\sqrt{2}, \sqrt{2}]$ to obtain the modulated data.

In this embodiment, a 1+D $\pi/2$ BPSK modulation manner is defined as follows: On the basis of the $\pi/2$ BPSK modulation, the first modulated data is convolved with $[\sqrt{2}, \sqrt{2}]$; and an obtained result is the modulated data of 1+D $\pi/2$ BPSK. Here D denotes delay. In this case, the data in each data block is first modulated into the first modulated data of $\pi/2$ BPSK. Here in each data block of the first modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram. Then convolution is performed on the first modulated data to obtain 1+D $\pi/2$ BPSK.

In an embodiment, the step of convolving the first modulated data with $[\sqrt{2}, \sqrt{2}]$ includes performing circular convolution on the first modulated data and $[\sqrt{2}, \sqrt{2}]$.

In an embodiment, the set modulation manner includes a $\pi/4$ BPSK modulation based on a delay accumulation.

Step 120 includes the following: The $\pi/4$ BPSK modulation is performed on the data to obtain second modulated data, and the second modulated data is convolved with $[\sqrt{2}, \sqrt{2}]$ to obtain the modulated data.

In an embodiment, the step of performing the $\pi/4$ BPSK modulation on the data to obtain the second modulated data includes the steps below.

The $\pi/2$ BPSK modulation is performed on the data to obtain the first modulated data; and interpolating is performed between the two adjacent modulation symbols in each data block of the first modulated data to obtain the second modulated data.

In an embodiment, the step of convolving the second modulated data with $[\sqrt{2}, \sqrt{2}]$ includes performing circular convolution on the second modulated data and $[\sqrt{2}, \sqrt{2}]$.

In this embodiment, a 1+D $\pi/4$ BPSK modulation manner is defined as follows: On the basis of the $\pi/4$ BPSK modulation, the second modulated data is convolved with $[\sqrt{2}, \sqrt{2}]$; and an obtained result is the modulated data of 1+D $\pi/4$ BPSK. Here D denotes delay. In this case, the data in each data block is first modulated into the first modulated data of π/2 BPSK. Here in each data block of the first modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram. Then interpolating is performed on each data block of the first modulated data to obtain the second modulated data of π/4 BPSK. Then convolution is performed on the second modulated data to obtain the modulation date of 1+D π/4 BPSK.

In an embodiment, in each data block of the first modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram.

Alternatively, in each slot corresponding to the first modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram.

In an embodiment, in each data block of the first modulated data, the last interpolation is determined according to the first modulation symbol in the each data block and the last modulation symbol in the each data block.

In an embodiment, the phase of an interpolation between the two adjacent modulation symbols in each data block of the first modulated data is the phase mean of the two adjacent modulation symbols, and the modulus of the interpolation is the same as the modulus of the first modulated data.

In an embodiment, the set modulation manner includes an 8-quadrature amplitude modulation with a phase rotation of π/2, that is, π/2 8QAM. In each data block of the modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram.

Alternatively, in each slot corresponding to the modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram.

In this embodiment, π/2 8QAM manner is defined as follows: On the basis of the 8QAM, a modulation symbol in an odd position is fixed in the second quadrant of the constellation diagram or the fourth quadrant of the constellation diagram, and a modulation symbol in an even position is fixed in the first quadrant of the constellation diagram or the third quadrant of the constellation diagram. The data modulation manner is set to the π/2 8QAM related to the time domain position, thereby guaranteeing the relatively low PAPR.

In an embodiment, the set modulation manner includes an 8-amplitude phase shift keying modulation with a phase rotation of π/2, that is, π/2 8APSK modulation.

In each data block of the modulated data, a modulation symbol in an odd position is located in the second quadrant of the constellation diagram or the fourth quadrant of the constellation diagram; and a modulation symbol in an even position is located in the first quadrant of the constellation diagram, in the third quadrant of the constellation diagram, or on a y axis of the constellation diagram.

Alternatively, in each slot corresponding to the modulated data, a modulation symbol in an odd position is located in the second quadrant of the constellation diagram or the fourth quadrant of the constellation diagram; and a modulation symbol in an even position is located in the first quadrant of the constellation diagram, in the third quadrant of the constellation diagram, or on an x axis of the constellation diagram.

In this embodiment, a π/2 8APSK modulation manner is defined as follows: On the basis of 8APSK, a modulation symbol in an odd position is fixed in the second quadrant of the constellation diagram, in the fourth quadrant of the constellation diagram, or on the y axis of the constellation diagram; and a modulation symbol in an even position is located in the first quadrant of the constellation diagram, in the third quadrant of the constellation diagram, or on the x axis of the constellation diagram. The data modulation manner is set to the π/2 8APSK related to the time domain position, thereby guaranteeing the relatively low PAPR.

In an embodiment, the set modulation manner includes a single-carrier modulation.

In this embodiment, the preceding set modulation manner may be applied to waveforms in the single-carrier type such as a DFT-s-OFDM waveform, a single-carrier (SC) waveform, and a QAM waveform. Relatively sound PAPR performance may be guaranteed for different waveforms.

In an embodiment, the step of transmitting the modulated data on a physical resource includes the following: The modulation symbol is transmitted in the time domain directly or that filtering, digital-to-analog conversion, and the like are performed on the modulation symbol; and then the modulation symbol is transmitted in a radio-frequency link.

In an embodiment, the step of transmitting the modulation symbol on the physical resource includes the following: Fourier transform, inverse discrete Fourier transform (IDFT), digital-to-analog conversion, and the like are performed on the modulation symbol; and then the modulation symbol is transmitted in a radio-frequency link.

In an embodiment, before a sequence [s(k)] of the modulated data is carried on a physical time-frequency resource for transmission, other operations may also be included. For example, a reference sequence and filtering are added in the sequence [s(k)], at two ends of the sequence [s(k)], or in the middle of the sequence [s(k)].

The data modulation and transmission are exemplarily described hereinafter via embodiments.

FIG. 2 is a diagram of π/2 BPSK modulation according to an embodiment. An experienced channel is a fading channel with a certain multipath delay. Moreover, a certain phase noise exists at each of a sending end and a receiving end. In this case, a segment of continuous reference signals exists at a head in each data block, and a segment of continuous reference signals exists at a tail in each data block, with data information staying in the middle. The set modulation manner is π/2 BPSK. The length is 98. The modulation manner of the head reference signal and the tail reference signal is π/2 BPSK. The length of the head reference signal and the length of the tail reference signal are 4 and 6 respectively.

The π/2 BPSK modulation is performed on a data bit sequence. Moreover, the data bit sequence is adjusted according to a time domain position so that a modulation symbol in an odd position in a data block is in the second quadrant of the constellation diagram or the fourth quadrant of the constellation diagram and a modulation symbol in an even position in the data block is in the first quadrant of the constellation diagram or the third quadrant of the constellation diagram.

FIG. 3 is a diagram of $\pi/2$ BPSK modulation according to another embodiment. An experience channel is a fading channel with a certain multipath delay. Moreover, a rapidly-changing phase noise exists at each of a sending end and a receiving end. In this case, a segment of continuous reference signals exists at a head in each data block, a segment of continuous reference signals exists at a tail in each data block, and two intermediate reference signal blocks exist in each data block. The remaining of each data block is data information. A set modulation manner is $\pi/2$ BPSK. The length is 90. The modulation manner of the head reference signal and the tail reference signal is $\pi/2$ BPSK. The length of the head reference signal and the length of the tail reference signal are 4 and 6 respectively. The modulation manner of the two intermediate reference signal blocks is $\pi/2$ BPSK. The length of each intermediate reference signal block is 4.

The $\pi/2$ BPSK modulation is performed on a data bit sequence. Moreover, the data bit sequence is adjusted according to a time domain position so that a modulation symbol in an odd position in a data block is in the second quadrant of the constellation diagram or the fourth quadrant of the constellation diagram and a modulation symbol in an even position in the data block is in the first quadrant of the constellation diagram or the third quadrant of the constellation diagram.

FIG. 4 is a diagram of $1+D$ $\pi/2$ BPSK modulation according to an embodiment. An experience channel is a fading channel with a certain multipath delay. Moreover, a rapidly-changing phase noise exists at each of a sending end and a receiving end. In this case, a segment of continuous reference signals exists at a head in each data block, a segment of continuous reference signals exists at a tail in each data block, and two intermediate reference signal blocks exist in each data block. The remaining of each data block is data information. A set modulation manner is $1+D$ $\pi/2$ BPSK. The length is 90. The modulation manner of the head reference signal and the tail reference signal is $1+D$ $\pi/2$ BPSK. The length of the head reference signal and the length of the tail reference signal are 4 and 6 respectively. The modulation manner of two intermediate reference signal blocks is $\pi/2$ BPSK. The length of each intermediate reference signal block is 4.

The $\pi/2$ BPSK modulation is performed on a data bit sequence. Moreover, the data bit sequence is adjusted according to a time domain position so that a modulation symbol in an odd position in a data block is in the second quadrant of the constellation diagram or the fourth quadrant of the constellation diagram and a modulation symbol in an even position in the data block is in the first quadrant of the constellation diagram or the third quadrant of the constellation diagram. Then circular convolution is performed on the $\pi/2$ BPSK sequence in the entire data block and $[\sqrt{2}, \sqrt{2}]$ to obtain $1+D$ $\pi/2$ BPSK.

FIG. 5 is a diagram of $1+D$ $\pi/4$ BPSK modulation according to an embodiment. An experience channel is a fading channel with a certain multipath delay. Moreover, a rapidly-changing phase noise exists at each of a sending end and a receiving end. In this case, a segment of continuous reference signals exists at a head in each data block, a segment of continuous reference signals exists at a tail in each data block, and two intermediate reference signal blocks exist in each data block. The remaining of each data block is data information. A set modulation manner is $1+D$ $\pi/4$ BPSK. The length is 90. The modulation of the head reference signal and the tail reference signal is $\pi/4$ BPSK. The length of the head reference signal and the length of the tail reference signal are 4 and 6 respectively. The modulation of the two intermediate reference signal blocks is $\pi/2$ BPSK. The length of each intermediate reference signal block is 4.

The $\pi/2$ BPSK modulation is performed on a data bit sequence. Moreover, the data bit sequence is adjusted according to a time domain position so that a modulation symbol in an odd position in a data block is in the second quadrant of the constellation diagram or the fourth quadrant of the constellation diagram and a modulation symbol in an even position in the data block is in the first quadrant of the constellation diagram or the third quadrant of the constellation diagram. Then an interpolating operation is performed on the $\pi/2$ BPSK sequence in the entire data block to obtain the modulated data of $\pi/4$ BPSK. The last interpolation result of each data block is an interpolation result of the first modulation symbol and the last modulation symbol.

Figure 6:
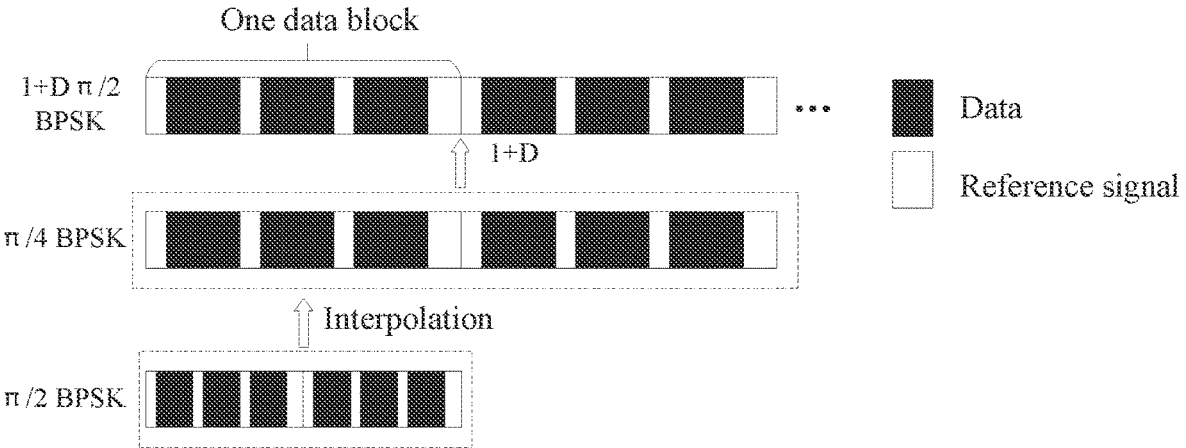
FIG. 6 is a diagram of 1+D $\pi/4$ BPSK modulation according to another embodiment.

FIG. 6 is a diagram of $1+D$ $\pi/4$ BPSK modulation according to another embodiment. An experience channel is a fading channel with a certain multipath delay. Moreover, a rapidly-changing phase noise exists at each of a sending end and a receiving end. In this case, a segment of continuous reference signals exists at a head in each data block, a segment of continuous reference signals exists at a tail in each data block, and two intermediate reference signal blocks exist in each data block. The remaining of each data block is data information. A set modulation manner is $1+D$ $\pi/4$ BPSK. The length is 90. The modulation of the head reference signal and the tail reference signal is $1+D$ $\pi/4$ BPSK. The length of the head reference signal and the length of the tail reference signal are 4 and 6 respectively. The modulation of the two intermediate reference signal blocks is $\pi/2$ BPSK. The length of each intermediate reference signal block is 4.

The $\pi/2$ BPSK modulation is performed on a data bit sequence. Moreover, the data bit sequence is adjusted according to a time domain position so that a modulation symbol in an odd position in a data block is in the second quadrant of the constellation diagram or the fourth quadrant of the constellation diagram and a modulation symbol in an even position in the data block is in the first quadrant of the constellation diagram or the third quadrant of the constellation diagram. Then an interpolating operation is performed on the $\pi/2$ BPSK sequence in the entire data block to obtain the modulated data of $\pi/4$ BPSK. The last interpolation result of each data block is an interpolation result of the first modulation symbol and the last modulation symbol. Then circular convolution is performed on the $\pi/4$ BPSK sequence in the entire data block and $[\sqrt{2}, \sqrt{2}]$ to obtain the modulated data of $1+D$ $\pi/4$ BPSK.

Figure 7:
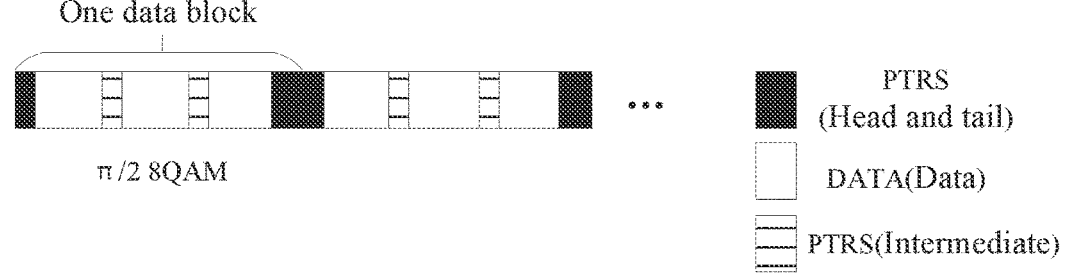
FIG. 7 is a diagram of $\pi/2$ 8QAM according to an embodiment.

FIG. 7 is a diagram of $\pi/2$ 8QAM according to an embodiment. An experience channel is a fading channel with a certain multipath delay. Moreover, a rapidly-changing phase noise exists at each of a sending end and a receiving end. In this case, a segment of continuous reference signals exists at a head in each data block, a segment of continuous reference signals exists at a tail in each data block, and two intermediate reference signal blocks exist in each data block. The remaining of each data block is data information. FIG. 7 illustrates a constellation diagram of $\pi/2$ 8QAM. A set modulation manner is $\pi/2$ 8QAM. The length is 90. The modulation of the head reference signal and the tail reference signal is π/2 8QAM. The length of the head reference signal and the length of the tail reference signal are 4 and 6 respectively. The modulation of the two intermediate reference signal blocks is π/2 8QAM. The length of each intermediate reference signal block is 4.

Figure 8:
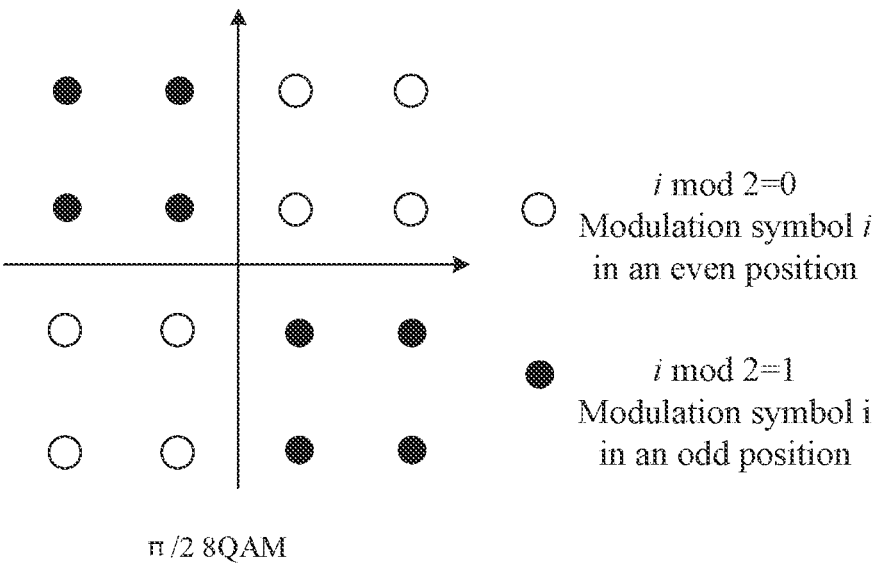
FIG. 8 is a diagram of a constellation diagram of $\pi/2$ 8QAM according to an embodiment.

FIG. 8 is a diagram of a constellation diagram of π/2 8QAM according to an embodiment. As shown in FIG. 8, π/2 8QAM is performed on a data bit sequence. Moreover, the data bit sequence is adjusted according to a time domain position so that a modulation symbol in an odd position in a data block is in the second quadrant of the constellation diagram or the fourth quadrant of the constellation diagram and a modulation symbol in an even position in the data block is in the first quadrant of the constellation diagram or the third quadrant of the constellation diagram.

Figure 9:
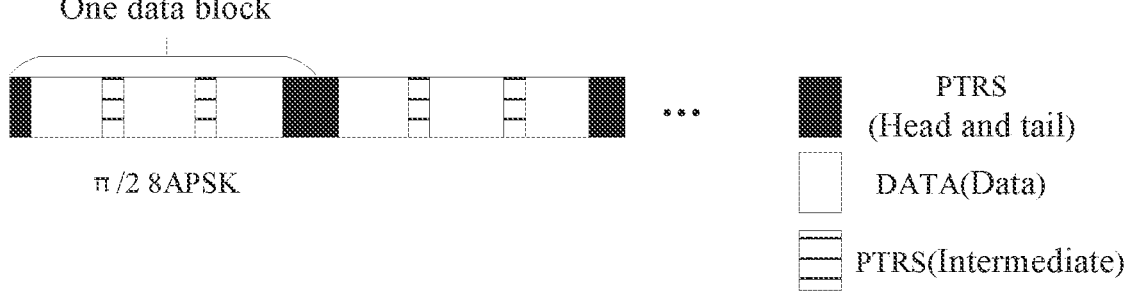
FIG. 9 is a diagram of $\pi/2$ 8APSK modulation according to an embodiment.

FIG. 9 is a diagram of a π/2 8APSK modulation according to an embodiment. An experience channel is a fading channel with a certain multipath delay. Moreover, a rapidly-changing phase noise exists at each of a sending end and a receiving end. In this case, a segment of continuous reference signals exists at a head in each data block, a segment of continuous reference signals exists at a tail in each data block, and two intermediate reference signal blocks exist in each data block. The remaining of each data block is data. FIG. 9 illustrates a constellation diagram of π/2 8APSK. A set modulation manner is π/2 8APSK. The length is 90. The modulation of the head reference signal and the tail reference signal is π/2 8APSK. The length of the head reference signal and the length of the tail reference signal are 4 and 6 respectively. The modulation of the two intermediate reference signal blocks is π/2 8APSK. The length of each intermediate reference signal block is 4.

Figure 10:
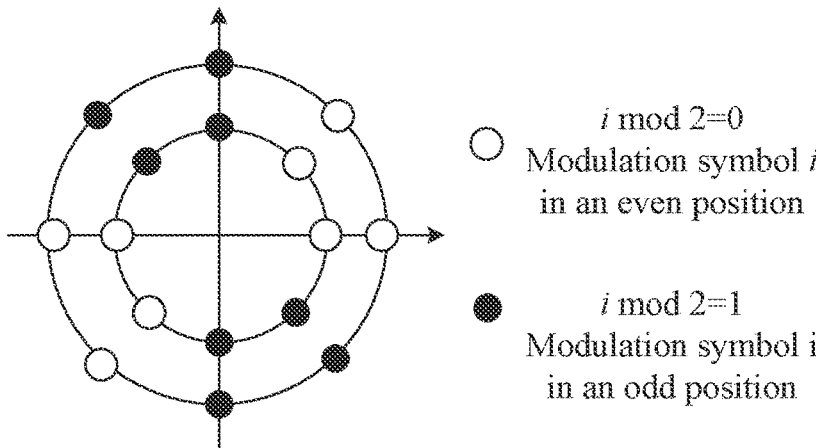
FIG. 10 is a diagram of a constellation diagram of $\pi/2$ 8APSK modulation according to an embodiment.

FIG. 10 is a diagram of a constellation diagram of a π/2 8APSK modulation according to an embodiment. As shown in FIG. 10, a π/2 8APSK modulation is performed on a data bit sequence. Moreover, the data bit sequence is adjusted according to a time domain position so that a modulation symbol in an odd position in a data block is in the second quadrant of the constellation diagram, in the fourth quadrant of the constellation diagram, or on the y axis of the constellation diagram and a modulation symbol in an even position in the data block is in the first quadrant of the constellation diagram, in the third quadrant of the constellation diagram, or on the x axis of the constellation diagram.

For a transmission end, a binary bit data sequence is encoded. A π/2 BPSK constellation modulation is performed on the encoded binary bit data sequence. Then the modulated binary bit data sequence is adjusted according to the time domain position. That is, a set modulation manner related to the time domain position is used so that modulation symbols in different time domain positions are located in relevant positions in the constellation diagram. A modulated symbol is transmitted in a radio-frequency link after being subjected to DFT, resource mapping, IDFT, digital-to-analog conversion, etc.

Figure 11:
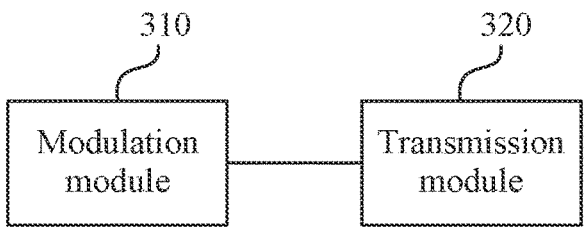
FIG. 11 is a structural diagram of a data transmission apparatus according to an embodiment.

Embodiments of the present application further provide a data transmission apparatus. FIG. 11 is a structural diagram of a data transmission apparatus according to an embodiment. As shown in FIG. 11, the data transmission apparatus includes a modulation module 210 and a transmission module 220.

The modulation module 210 is configured to modulate data in a time domain according to a set modulation manner to obtain modulated data, where the set modulation manner is associated with a time domain position of a modulation symbol in the modulated data.

The transmission module 220 is configured to transmit the modulated data.

For the data transmission apparatus in this embodiment, the set modulation manner is associated with the time domain position of the modulation symbol. For example, a modulation symbol in an odd position and a modulation symbol in an even position are located in different quadrants of a constellation diagram so that modulation symbols in adjacent time domain positions are not in the same quadrant but in adjacent quadrants, thereby the data is mapped to the time domain to reduce a PAPR.

In an embodiment, a position of the modulation symbol in the constellation diagram is associated with the time domain position.

In an embodiment, the time domain position includes a time domain position that has not been oversampled or a time domain position that has not been upsampled.

In an embodiment, a data block of the modulated data includes one of: data information; data information, a head reference signal, and a tail reference signal; data information and an intermediate reference signal; or data information, a head reference signal, a tail reference signal, and an intermediate reference signal.

In an embodiment, the set modulation manner includes a binary phase shift keying modulation with a phase rotation of π/2 (π/2 BPSK modulation).

In an embodiment, in each data block of the modulated data, a modulation symbol in an odd position is located in a second quadrant of the constellation diagram or a fourth quadrant of the constellation diagram, and a modulation symbol in an even position is located in a first quadrant of the constellation diagram or a third quadrant of the constellation diagram.

Alternatively, in each slot corresponding to the modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram.

In an embodiment, the set modulation manner includes a binary phase shift keying modulation with a phase rotation of π/4 (π/4 BPSK modulation).

The modulation module 210 includes a first modulation module and a first interpolation module.

The first modulation module is configured to perform the π/2 BPSK modulation on the data to obtain first modulated data.

The first interpolation module is configured to perform interpolating between two adjacent modulation symbols in each data block of the first modulated data to obtain the modulated data.

In an embodiment, the set modulation manner includes π/2 BPSK modulation based on a delay accumulation.

The modulation module 210 includes a second modulation module and a first convolution module.

The second modulation module is configured to perform the π/2 BPSK modulation on the data to obtain the first modulated data.

The first convolution module is configured to convolve the first modulated data with [√2, √2] to obtain the modulated data.

In an embodiment, the first convolution module is configured to perform circular convolution on the first modulated data and [√2, √2].

In an embodiment, the set modulation manner includes a π/4 BPSK modulation based on a delay accumulation.

The modulation module 210 includes a third modulation module and a second convolution module.

The third modulation module is configured to perform the π/4 BPSK modulation on the data to obtain second modulated data.

The second convolution module is configured to convolve the second modulated data with $[\sqrt{2}, \sqrt{2}]$ to obtain the modulated data.

In an embodiment, the third modulation module includes a modulation unit and an interpolation unit.

The modulation unit is configured to perform the π/2 BPSK modulation on the data to obtain the first modulated data.

The interpolation module is configured to perform interpolating between two adjacent modulation symbols in each data block of the first modulated data to obtain the second modulated data.

In an embodiment, the first convolution module is configured to perform circular convolution on the second modulated data and $[\sqrt{2}, \sqrt{2}]$.

In an embodiment, in each data block of the first modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram.

Alternatively, in each slot corresponding to the first modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram.

In an embodiment, in each data block of the first modulated data, the last interpolation is determined according to the first modulation symbol in the each data block and the last modulation symbol in the each data block.

In an embodiment, the phase of an interpolation between the two adjacent modulation symbols in each data block of the first modulated data is the phase mean of the two adjacent modulation symbols, and the modulus of the interpolation is the same as the modulus of the first modulated data.

In an embodiment, the set modulation manner includes an 8-quadrature amplitude modulation with a phase rotation of π/2 (π/2 8QAM).

In each data block of the modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram.

Alternatively, in each slot corresponding to the modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram.

In an embodiment, the set modulation manner includes an 8-amplitude phase shift keying modulation with a phase rotation of π/2 (π/2 8APSK modulation).

In each data block of the modulated data, a modulation symbol in an odd position is located in the second quadrant of the constellation diagram or the fourth quadrant of the constellation diagram, and a modulation symbol in an even position is located in the first quadrant of the constellation diagram, the third quadrant of the constellation diagram, or a y axis of the constellation diagram.

Alternatively, in each slot corresponding to the modulated data, a modulation symbol in an odd position is located in the second quadrant of the constellation diagram or the fourth quadrant of the constellation diagram, and a modulation symbol in an even position is located in the first quadrant of the constellation diagram, the third quadrant of the constellation diagram, or an x axis of the constellation diagram.

In an embodiment, the set modulation manner includes a single-carrier modulation.

The data transmission apparatus provided in this embodiment and the data transmission method provided in the preceding embodiments belong to the same concept. For technical details not described in detail in this embodiment, reference may be made to any one of the preceding embodiments. The embodiment has the same beneficial effects as the performed data transmission method.

Figure 12:
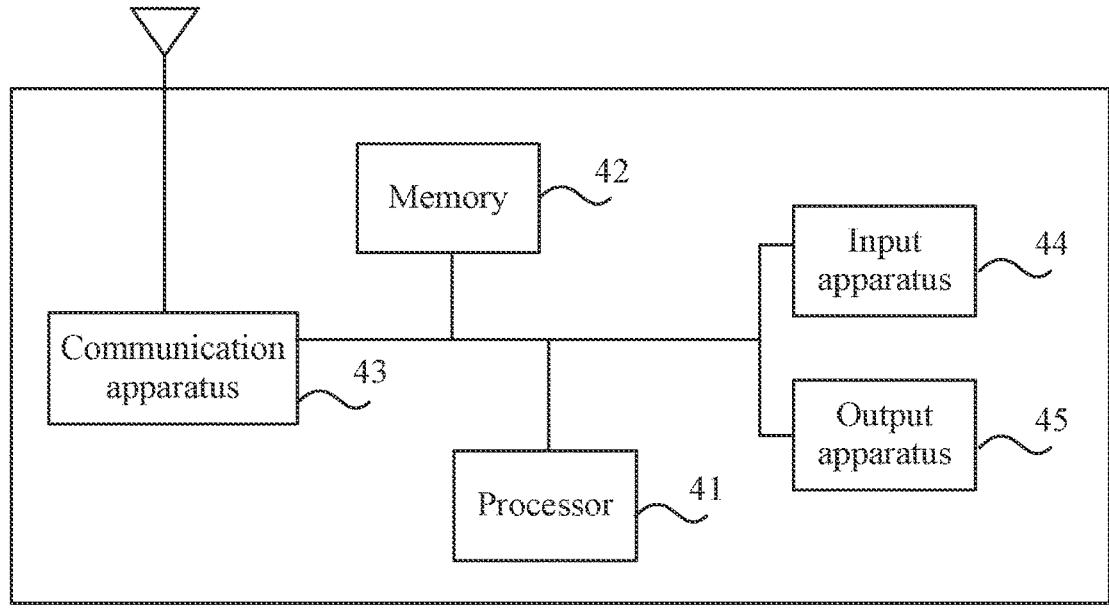
FIG. 12 is a structural diagram of the hardware of a communication node according to an embodiment.

Embodiments of the present application further provide a communication node. FIG. 12 is a structural diagram of the hardware of a communication node according to an embodiment. As shown in FIG. 12, the communication node provided by the present application includes a memory 42, a processor 41, and a computer program stored in the memory and executable by the processor, where when executing the program, the processor 41 performs the preceding data transmission method.

The communication node may further include the memory 42. One or more processors 41 may be provided in the communication node. One processor 41 is used as an example in FIG. 12. The memory 42 is configured to store one or more programs. When the one or more programs are executed by the one or more processors 41, the one or more processors 41 are caused to perform the data transmission method in embodiments of the present application.

The communication node further includes a communication apparatus 43, an input apparatus 44, and an output apparatus 45.

The processor 41, the memory 42, the communication apparatus 43, the input apparatus 44 and the output apparatus 45 in the communication node may be connected through a bus or in other manners. The connection through a bus is used as an example in FIG. 12.

The input apparatus 44 may be configured to receive inputted digital or character information and generate key signal input related to user settings and function control of the communication node. The output apparatus 45 may include a display device such as a display screen.

The communication apparatus 43 may include a receiver and a sender. The communication apparatus 43 is configured to perform information transceiving communication under the control of the processor 41.

As a computer-readable storage medium, the storage apparatus 42 may be configured to store software programs, computer-executable programs and modules, such as program instructions/modules (for example, the modulation module 310 and the transmission module 320 that are in the data transmission apparatus) corresponding to the data transmission method according to embodiments of the present application. The memory 42 may include a program storage region and a data storage region, where the program storage region may store an operating system and an application program required by at least one function, and the data storage region may store data or the like created according to the use of the communication node. Additionally, the memory 42 may include a high-speed random-access memory and may also include a nonvolatile memory, such as at least one magnetic disk memory, a flash memory or another nonvolatile solid-state memory. In some examples, the memory 42 may include memories which are remotely disposed relative to the processor 41, and these remote memories may be connected to the communication node via a network. Examples of the preceding network include, but are not limited to, the Internet, an intranet, a local area network, a mobile communication network, and a combination thereof.

Embodiments of the present application further provide a storage medium. The storage medium stores a computer program which, when executed by a processor, causes the processor to perform any data transmission method according to embodiments of the present application. The method includes the following: Data is modulated in a time domain according to a set modulation manner to obtain modulated data, where the set modulation manner is associated with a time domain position of a modulation symbol in the modulated data; and the modulated data is transmitted.

A computer storage medium in an embodiment of the present application may adopt any combination of one or more computer-readable media. The computer-readable media may be computer-readable signal media or computer-readable storage media. For example, a computer-readable storage medium may be, but is not limited to, an electrical, magnetic, optical, electromagnetic, infrared or semiconductor system, apparatus or device or any combination thereof. More specific examples of the computer-readable storage medium include (non-exhaustive list): an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disc ROM (CD-ROM), an optical memory, a magnetic memory or any suitable combination thereof. The computer-readable storage medium may be any tangible medium including or storing a program. The program may be used by or used in conjunction with an instruction execution system, apparatus or device.

A computer-readable signal medium may include a data signal propagated in a baseband or as part of a carrier. The data signal carries computer-readable program codes. The data signal propagated in this manner may be in multiple forms including, but not limited to, an electromagnetic signal, an optical signal or any suitable combination thereof. The computer-readable signal medium may also be any computer-readable medium other than the computer-readable storage medium. The computer-readable medium may send, propagate or transmit a program used by or used in conjunction with an instruction execution system, apparatus or device.

The program codes included in the computer-readable medium may be transmitted in any suitable medium including, but not limited to, a wireless medium, a wire, an optical cable, a radio frequency (RF) or any suitable combination thereof.

Computer program codes for performing the operations of the present application may be written in one or more programming languages or a combination thereof. The programming languages include object-oriented programming languages such as Java, Smalltalk, and C++ and may further include conventional procedural programming languages such as "C" or similar programming languages. The program codes may be executed entirely on a user computer, executed partly on a user computer, executed as a standalone software package, executed partly on a user computer and partly on a remote computer, or executed entirely on a remote computer or a server. In the case where the remote computer is involved, the remote computer may be connected to the user computer through any type of network including a local area network (LAN) or a wide area network (WAN), or may be connected to an external computer (for example, via the Internet provided by an Internet service provider).

It is to be understood by those skilled in the art that the term user terminal encompasses any suitable type of wireless user device, for example, a mobile phone, a portable data processing apparatus, a portable web browser or a vehicle-mounted mobile station.

Generally speaking, the embodiments of the present application may be implemented in hardware or special-purpose circuits, software, logic or any combination thereof. For example, some aspects may be implemented in hardware while other aspects may be implemented in firmware or software executable by a controller, a microprocessor or another computing apparatus, though the present application is not limited thereto.

The embodiments of the present application may be implemented through the execution of computer program instructions by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps and logic circuits, modules and functions. Computer programs may be stored on a memory. The memory may be of any type suitable for a local technical environment and may be implemented using any suitable data storage technology, such as, but not limited to, a read-only memory (ROM), a random-access memory (RAM) and an optical memory device and system (a digital video disc (DVD) or a compact disc (CD)). Computer-readable media may include non-transitory storage media. The data processor may be of any type suitable for a local technical environment, for example, but not limited to, a general-purpose computer, a special-purpose computer, a microprocessor, a digital signal processor (DSP), an application-specific integrated circuit (ASIC), a field-programmable gate array (FGPA) and a processor based on a multi-core processor architecture.

What is claimed is:

1. A data transmission method, comprising:
modulating data in a time domain according to a set modulation manner to obtain modulated data, wherein the set modulation manner is associated with a time domain position of a modulation symbol in the modulated data; and
transmitting the modulated data;
wherein a modulation symbol in an odd position of the time domain and a modulation symbol in an even position of the time domain are located in different quadrants of a constellation diagram, so that modulation symbols in adjacent time domain positions are not in a same quadrant but in adjacent quadrants.

2. The method according to claim 1, wherein a position of the modulation symbol in the constellation diagram is associated with the time domain position.

3. The method according to claim 1, wherein the time domain position comprises a time domain position that has not been oversampled or a time domain position that has not been upsampled.

4. The method according to claim 1, wherein a data block of the modulated data comprises one of:
    data information;
    data information, a head reference signal, and a tail reference signal;
    data information and an intermediate reference signal; or
    data information, a head reference signal, a tail reference signal, and an intermediate reference signal.

5. The method according to claim 1, wherein the set modulation manner comprises a binary phase shift keying modulation with a phase rotation of π/2 (π/2 BPSK modulation).

6. The method according to claim 5, wherein
    in each data block of the modulated data, a modulation symbol in an odd position is located in a second quadrant of the constellation diagram or a fourth quadrant of the constellation diagram, and a modulation symbol in an even position is located in a first quadrant of the constellation diagram or a third quadrant of the constellation diagram; or
    in each slot corresponding to the modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram.

7. The method according to claim 1, wherein the set modulation manner comprises a binary phase shift keying modulation with a phase rotation of π/4 (π/4 BPSK modulation); and
    modulating the data in the time domain according to the set modulation manner to obtain the modulated data comprises:
    performing a π/2 BPSK modulation on the data to obtain first modulated data; and
    performing interpolating between two adjacent modulation symbols in each data block of the first modulated data to obtain the modulated data.

8. The method according to claim 1, wherein the set modulation manner comprises a π/2 BPSK modulation based on a delay accumulation; and
    modulating the data in the time domain according to the set modulation manner to obtain the modulated data comprises:
    performing the π/2 BPSK modulation on the data to obtain first modulated data; and
    convolving the first modulated data with [√2, √2] to obtain the modulated data.

9. The method according to claim 8, wherein convolving the first modulated data with [√2, √2] comprises:
    performing circular convolution on the first modulated data and [√2, √2].

10. The method according to claim 1, wherein the set modulation manner comprises a π/4 BPSK modulation based on a delay accumulation; and
    modulating the data in the time domain according to the set modulation manner to obtain the modulated data comprises:

performing the π/4 BPSK modulation on the data to obtain second modulated data; and
    convolving the second modulated data with [√2, √2] to obtain the modulated data.

11. The method according to claim 10, wherein performing the π/4 BPSK modulation on the data to obtain the second modulated data comprises:
    performing a π/2 BPSK modulation on the data to obtain first modulated data; and
    performing interpolating between two adjacent modulation symbols in each data block of the first modulated data to obtain the second modulated data.

12. The method according to claim 10, wherein convolving the second modulated data with [√2, √2] comprises:
    performing circular convolution on the second modulated data and [√2, √2].

13. The method according to claim 7, wherein
    in the each data block of the first modulated data, a modulation symbol in an odd position is located in a second quadrant of the constellation diagram or a fourth quadrant of the constellation diagram, and a modulation symbol in an even position is located in a first quadrant of the constellation diagram or a third quadrant of the constellation diagram; or
    in each slot corresponding to the first modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram.

14. The method according to claim 7, wherein in the each data block of the first modulated data, a last interpolation is determined according to a first modulation symbol in the each data block and a last modulation symbol in the each data block.

15. The method according to claim 7, wherein a phase of an interpolation between the two adjacent modulation symbols in the each data block of the first modulated data is a phase mean of the two adjacent modulation symbols, and a modulus of the interpolation is same as a modulus of the first modulated data.

16. The method according to claim 1, wherein the set modulation manner comprises an 8-quadrature amplitude modulation with a phase rotation of π/2 (π/2 8QAM);
    in each data block of the modulated data, a modulation symbol in an odd position is located in a second quadrant of the constellation diagram or a fourth quadrant of the constellation diagram, and a modulation symbol in an even position is located in a first quadrant of the constellation diagram or a third quadrant of the constellation diagram; or
    in each slot corresponding to the modulated data, a modulation symbol in an odd position is located in the second quadrant of the constellation diagram or the fourth quadrant of the constellation diagram, and a modulation symbol in an even position is located in the first quadrant of the constellation diagram or the third quadrant of the constellation diagram.

17. The method according to claim 1, wherein the set modulation manner comprises an 8-amplitude phase shift keying modulation with a phase rotation of π/2 (π/2 8APSK modulation);
    in each data block of the modulated data, a modulation symbol in an odd position is located in a second quadrant of the constellation diagram or a fourth quadrant of the constellation diagram; and a modulation symbol in an even position is located in a first quadrant of the constellation diagram, in a third quadrant of the constellation diagram, or on a y axis of the constellation diagram; or in each slot corresponding to the modulated data, a modulation symbol in an odd position is located in the second quadrant of the constellation diagram or the fourth quadrant of the constellation diagram; and a modulation symbol in an even position is located in the first quadrant of the constellation diagram, in the third quadrant of the constellation diagram, or on an x axis of the constellation diagram.

18. The method according to claim 1, wherein the set modulation manner comprises a single-carrier modulation.

19. A communication node, comprising a memory, a processor and a computer program stored in the memory and executable by the processor, wherein when executing the program, the processor performs the following step:

modulating data in a time domain according to a set modulation manner to obtain modulated data, wherein the set modulation manner is associated with a time domain position of a modulation symbol in the modulated data; and transmitting the modulated data;

wherein a modulation symbol in an odd position of the time domain and a modulation symbol in an even position of the time domain are located in different quadrants of a constellation diagram, so that modulation symbols in adjacent time domain positions are not in a same quadrant but in adjacent quadrants.

20. A non-transitory computer-readable storage medium storing a computer program, wherein when executed by a processor, the computer program causes the processor to perform the following step:

modulating data in a time domain according to a set modulation manner to obtain modulated data, wherein the set modulation manner is associated with a time domain position of a modulation symbol in the modulated data; and transmitting the modulated data;

wherein a modulation symbol in an odd position of the time domain and a modulation symbol in an even position of the time domain are located in different quadrants of a constellation diagram, so that modulation symbols in adjacent time domain positions are not in a same quadrant but in adjacent quadrants.

* * * * *